Patented Sept. 12, 1944

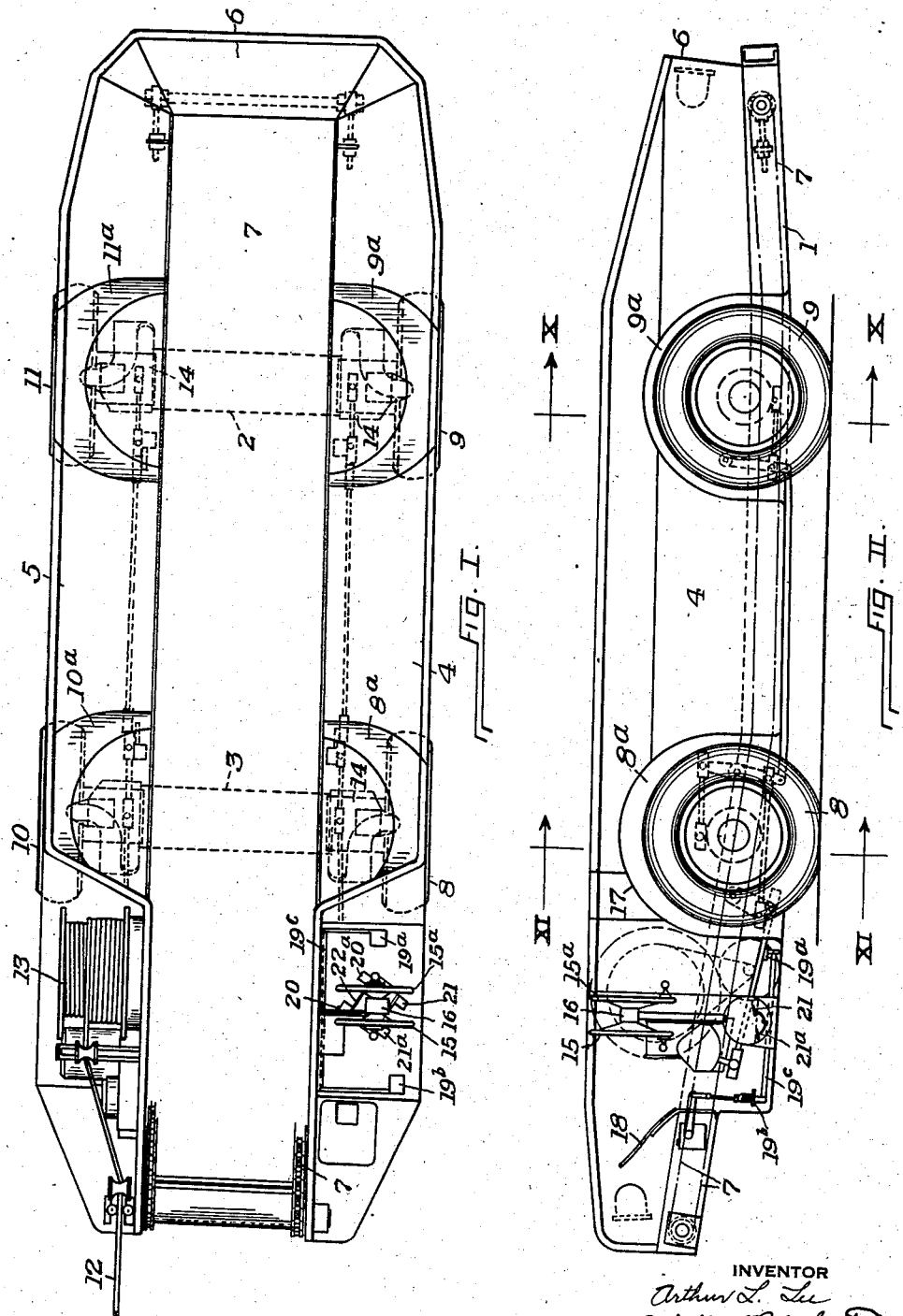

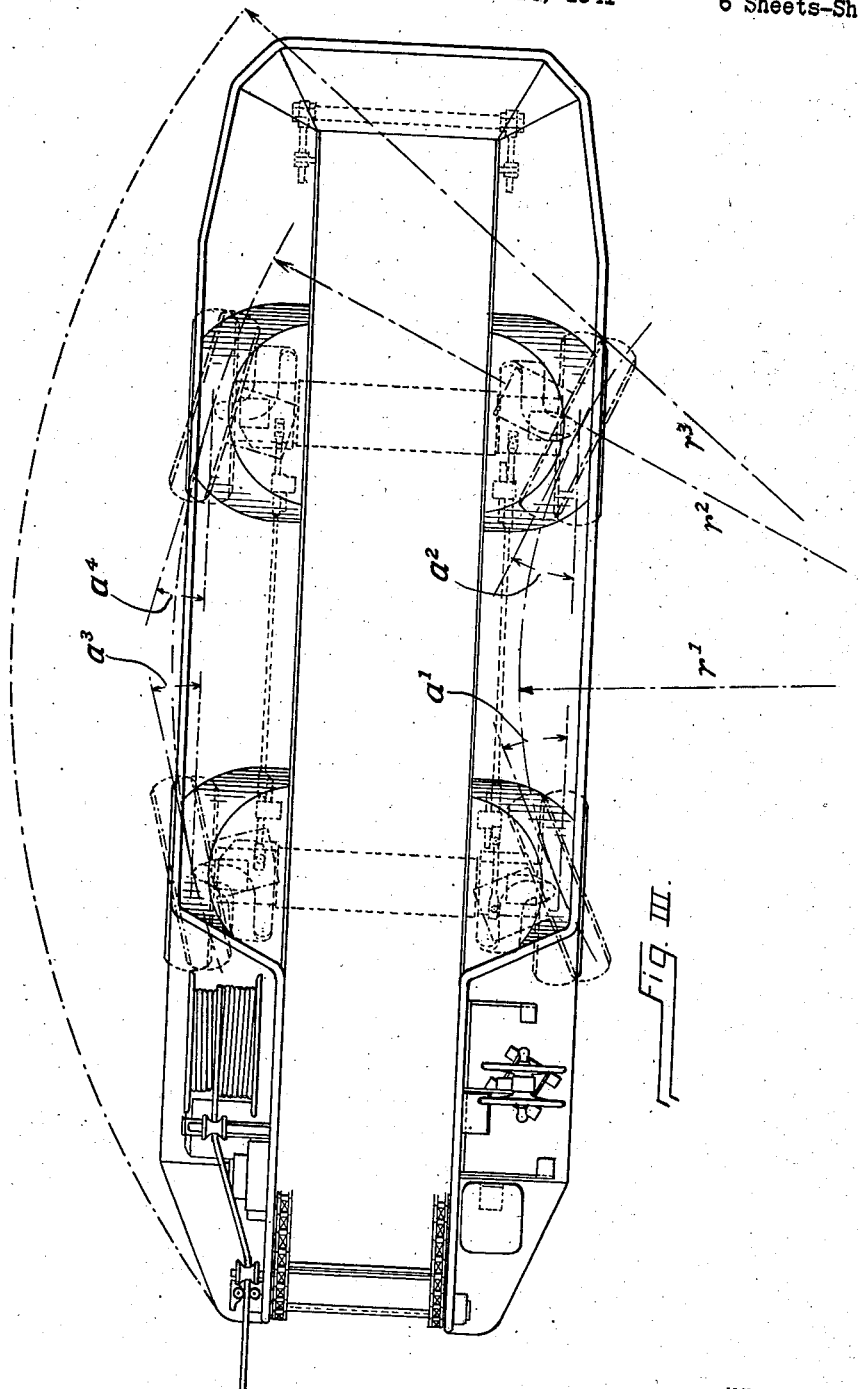

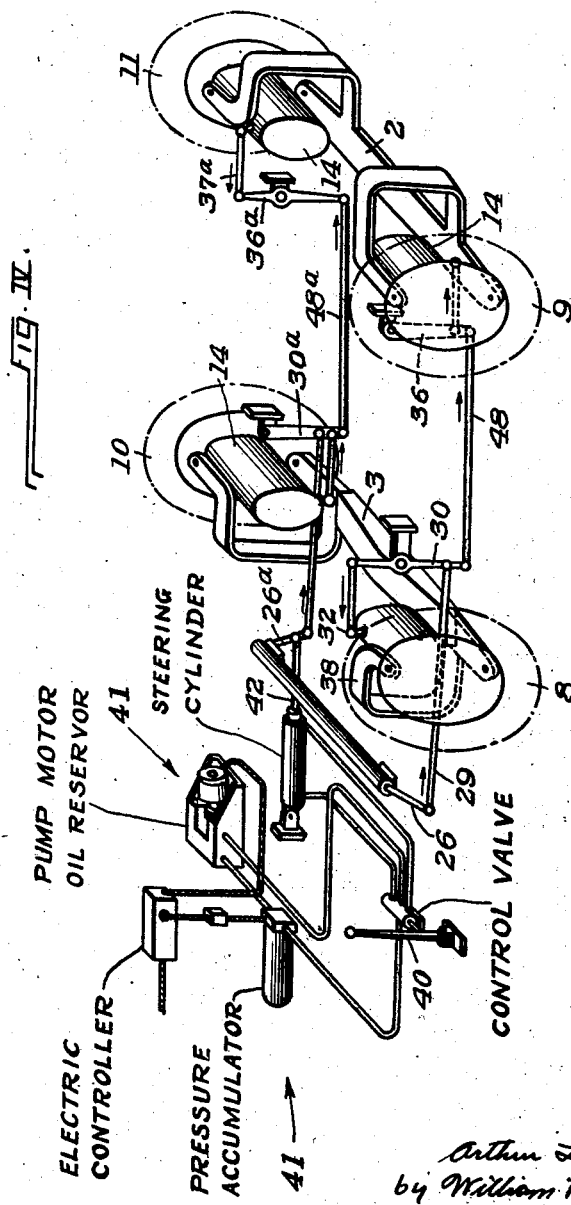

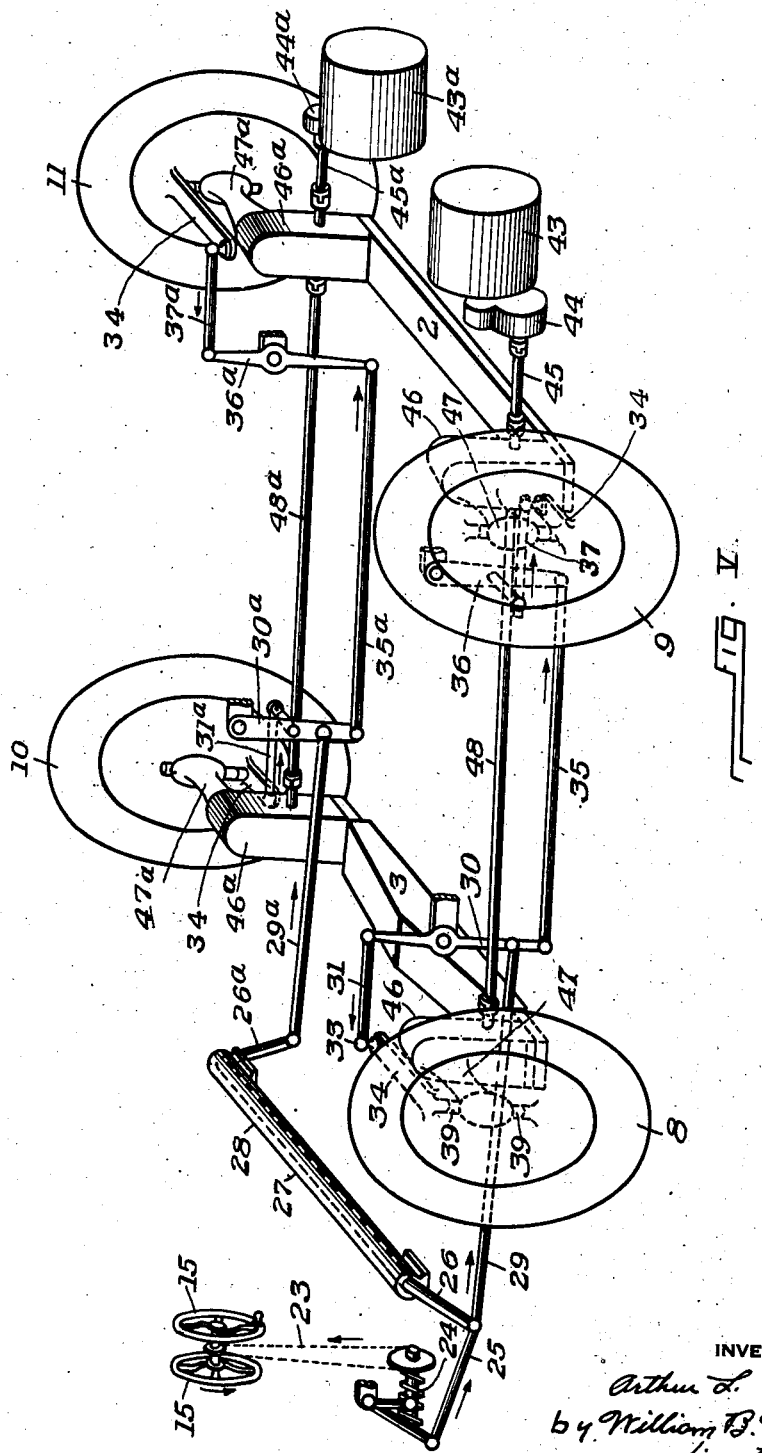

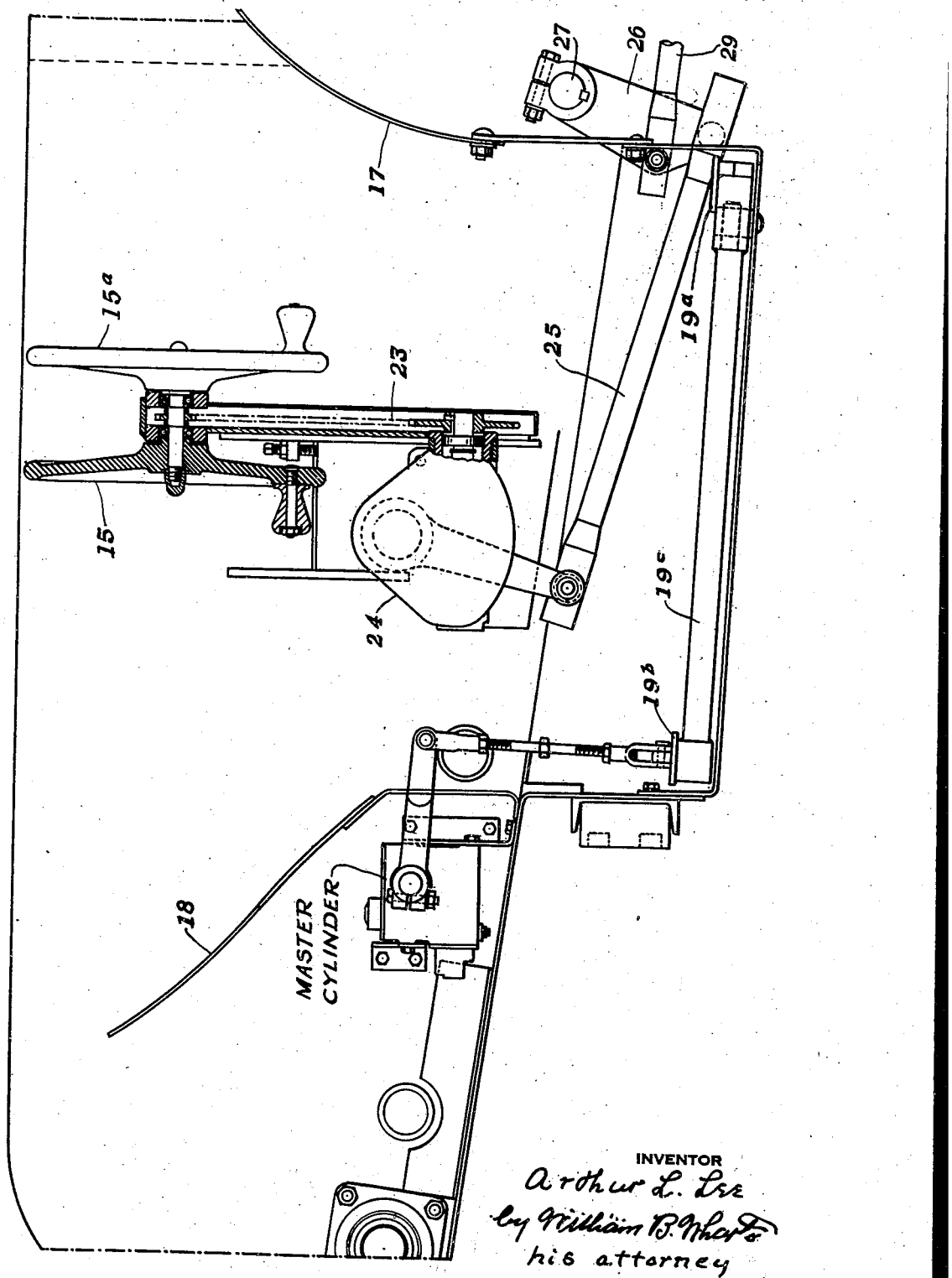

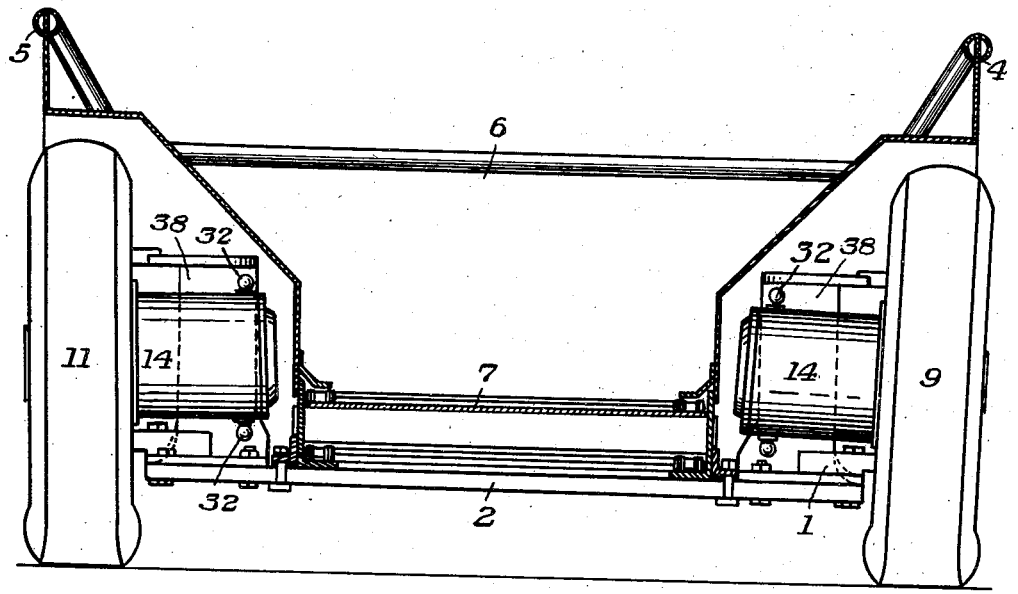
Fig. VII
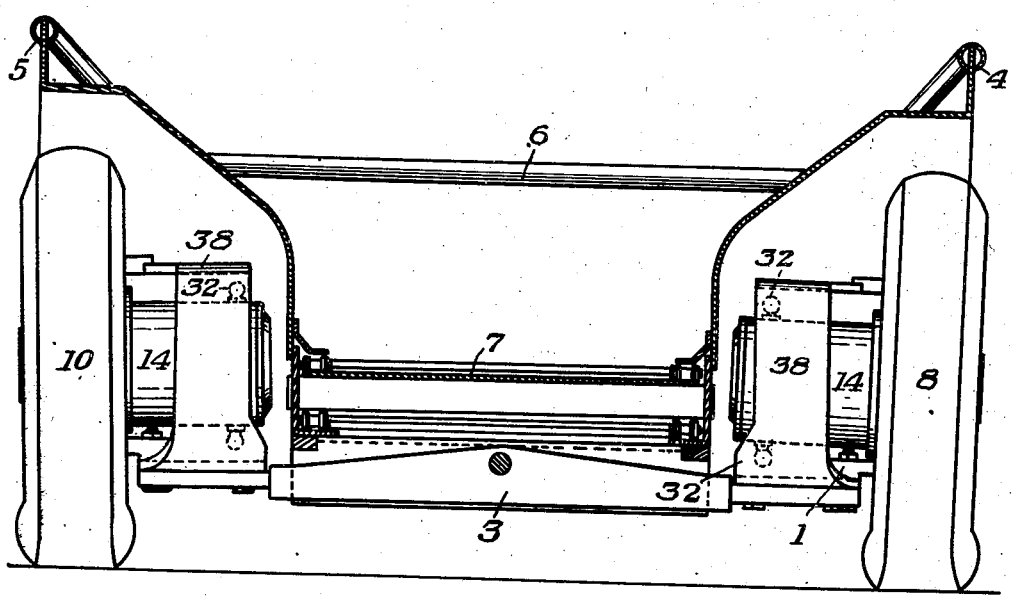
Fig. VIII

2,358,236

UNITED STATES PATENT OFFICE 2,358,236

MINE VEHICLE

Arthur L. Lee, Oakmont, Pa., assignor, by mesne assignments, to Joy Manufacturing Company, Franklin, Pa., a corporation Application March 14, 1941, Serial No. 383,331

8 Claims. (Cl. 280—91)

This invention relates to a mine vehicle.

In underground mines, and this is particularly true of coal mines, problems rise in transporting broken material from the face of the working to conveying means, such as mine railways, in which it is carried from the mine. It is a recent, but rapidly developing practice to utilize self-propelled haulage vehicles which run on rubber tires rather than on tracks, and which are individually steered, to carry coal from the face of a working to a gallery, or entry, in which it is loaded into mine cars. Such mine haulage vehicles, called shuttle cars, are operated under exacting conditions to which they must conform in order to give satisfactory service.

Such cars should be easily steered and have a very short turning radius in order that they may be maneuvered within restricted lateral space and around sharp turns. Because of the low headroom of the chambers and galleries in which shuttle cars are operated, their overall height is strictly limited, and it is, therefore, desirable that the material-carrying structure of a shuttle car extend far down between the wheels to increase the carrying capacity of the cars, even though such structure leaves little road clearance.

In addition to the desirability of adequate steering on a short turning radius, it is also very desirable that the driving means of the car be of a sort and so connected with the wheels of the car that high driving power is delivered to the wheels. While it is not important that such cars attain a speed which is comparable to the speed of surface vehicles, it is important that they have adequate power. As the power employed is necessarily supplied by an electrical motor, or motors, the placing of such motors, and their connection with the vehicle wheels is important.

The form and arrangement of the material-carrying structure of a mine haulage vehicle, and the mechanical structure of other mine vehicles, present obstacles to steering and driving arrangements which might readily be adapted to the body and chassis structure of surface vehicles. It is a primary object of my invention to provide a mine haulage vehicle in which either or both the advantages derived from directly driving all four wheels of the vehicle, and from simultaneously steering all four wheels of the vehicle, are obtained without sacrificing the load-carrying capacity of the vehicle, and without obstruction to the operation of conveying means for unloading the vehicle.

Another object of the invention is to make a mine haulage vehicle which is truly two directional in that the steering of the vehicle has the effect of forward movement whichever end of the vehicle may lead in its progress.

In the accompanying drawings, illustrative of an embodiment of my invention, Fig. I is a plan view of a mine haulage vehicle of the sort used as a coal mine shuttle car equipped with means for driving and for steering all four wheels of the vehicle.

Fig. II is a side elevation of the coal mine vehicle shown in Fig. I.

Fig. III is a plan view of the mine haulage vehicle similar to Fig. I, but illustrating extreme turning movement of the vehicle in steering; this view showing in broken lines the angularity of the wheels and their turning radii in the extreme turning position, with illustration of the difference in wheel angularity and the turning radii of the wheels on the two sides of the vehicle, and showing in broken lines the clearance arc for the body of the vehicle.

Fig. IV is an isometric schematic view illustrating arrangement of the vehicle wheels and driving and steering means for the wheels arranged in accordance with my invention; this view conforming to the showing of Figs. I, II and III, save in the detail that a hydraulic rather than a direct mechanical steering control is shown.

Fig. V is an isometric schematic view illustrating an arrangement of the vehicle wheels and the driving and steering means for the wheels, coresponding generally to the showing of Fig. IV, but illustrating alternative driving means for the wheels, and incidentally showing a direct mechanical, rather than a hydraulic, steering control.

Fig. VI is a fragmentary elevational view of the operator's compartment of the vehicle, showing on an enlarged scale certain elements of the control means for steering, driving, and braking the vehicle.

Fig. VII is a cross-sectional view through the mine-haulage vehicle of Figs. I and II, taken on the section line X—X of Fig. II.

Fig. VIII is a cross-sectional view through the mine-haulage vehicle of Figs. I and II, taken on the section line XI—XI of Fig. II.

While the invention has been primarily indicated, and will be hereinafter described, as embodied in mine shuttle cars, it should be understood that it applies also to mine vehicles of various specific types in which fundamentally analogous problems are encountered and to which the same primary solution of those problems applies; such as trucks for transporting mine machines, or to trucks integrated with mine machinery.

The mine vehicle specifically illustrated as embodying my invention is a shuttle car, the load-carrying structure of which comprises longitudinal frame elements 1, cross supports 2, and 3, side walls 4 and 5, a relatively low rear wall 6, and a conveyor 7 of the endless chain type extended the length of the vehicle. The wheels of the vehicle designated by reference numerals 8, 9, 10 and 11 are mounted from the cross supports 2 and 3 and stand in recesses 8a, 9a, 10a and 11a in the load-carrying structure of the vehicle.

The conveyor 7 is the bottom of the load-carrying structure, and from its edge the side walls of the vehicle rise. Throughout a large proportion of the vehicle length the side walls incline upwardly and outwardly from the edge of the conveyor to increase the capacity of the load-carrying structure, while permitting the entire load to be discharged by the conveyor. The wheel recesses 10a and 11a adjacent the receiving end of the vehicle are made by regionally changing the shape of the side walls 4 and 5, and the wheel recesses 8a and 10a adjacent the discharging end of the vehicle are partially provided in the same manner. Power for energizing the motors of the vehicle is provided by an electrical cable 12 carried by a cable reel 13 in the discharging region of the vehicle, but it is to be understood that storage batteries may alternatively be used. In the discharging region of the vehicle there is also mounted the steering and driving controls.

It is to be seen in Fig. II that the conveyor 7 which forms the bottom of the load-carrying structure of the vehicle lies at a relatively low level, and that this level is at its lowest in the regions between the four vehicle wheels, in which region the major load-carrying capacity of the vehicle is obtained. The structure of the vehicle is in fact so low with respect to the wheels, that elements of the load-carrying structure lie below the wheel centers. There are thus several primarily inconsistent but individually desirable properties to be obtained in the vehicle. In order to obtain a high load-carrying capacity, it is desirable that the load-carrying structure be underslung so much as to leave very little road clearance. This makes it difficult to mount power transmitting elements and steering connections across the vehicle body without exposing them to danger of injury. There is, however, substantial advantage to be gained by positively driving all four wheels of the vehicle and by simultaneously steering all four wheels of the vehicle.

In the preferred arrangement shown in the drawings, the wheels on each side of the load-carrying structure of the vehicle are driven independently of those of the other side of the vehicle by providing each wheel with its own individual motor, so that all four wheels of the vehicle are directly driven without driving interconnection across the vehicle. Referring to the drawings, each of the wheels 8, 9, 10 and 11 has its own housed electrical motor 14 which desirably, as shown is integrated in the structural assembly of the wheel to swing with the wheel in steering. The motors 14 are accommodated in the several wheel recesses formed in the load-carrying structure of the vehicle. In Figs. VII and VIII, and in Fig. III, which shows the motors 14 in dotted lines, it is apparent that the position of the motors on the wheels does not require wheel recesses of materially greater depth than would be necessary to permit swinging movement of the wheels about their steering axes.

I have found that the use of individually-powered wheels, eliminates power-transmission across the vehicle and the use of articulated driving connections, and gives adequate power for driving the vehicle when loaded, up relatively steep grades at a rate of speed as high as is desirable in mine chambers and passages. With individually-powered wheels, the connecting structure associated in the vehicle assembly is reduced to the steering connections and connections for operating the brakes of the vehicles.

The driving control of the vehicle is, for the operator, arranged in mirror symmetry in travel of the vehicle with either end leading. Thus, as shown in Figs. I to III, and in Figs. V and VI, the steering control initiates in a double steering wheel composed of two wheels, or disks, 15 and 15a, which have a common mounting 16, and which act on the same control elements for transmitting steering movement through the steering connections to the vehicle wheels. In travel of the vehicle with its discharge end leading, the operator may support himself against the wheel guard 17 of the front wheel 8, and in travel of the vehicle with the receiving end leading, he may rest against the support 18. Since the steering wheels 15 and 15a have a common connection, the actions of an operator to cause a turn to the right, or a turn to the left, with respect to the direction in which he is facing, are the same whichever end of the vehicle may lead. Brake pedals 19a and 19b, having connection to a common brake shaft 19c connected by conventional brake-operating means with all four wheels of the vehicle, are placed in such position that the operator uses the same foot for braking in both directions of travel. Also control pedals 20, 20a and 21, 21a are placed in identical positions with respect to the direction of travel of the vehicle. Thus pedal 20 gives forward travel with the discharge end of the vehicle leading and pedal 20a is a reversing pedal. Similarly pedal 21 gives forward travel with the receiving end of the vehicle leading and pedal 21a is a reversing pedal. All four pedals are connected through a master switch 22. Thus the same foot action controls forward or backward movement in opposed positions of the operator in driving the vehicle. It will be understood that brakes and brake-operating connections from the brake shaft 19c are omitted from the drawings, since they would tend to obscure the showing of the steering and driving connections.

As shown in Figs. I, II, V and VI, that portion of the steering apparatus which I term the "steering control" consists of a chain and sprocket connection 23 from the dual steering wheels 15 and 15a to a worm 24, which through linkages designated generally by reference numeral 25 connects with an arm 26.

Arm 26 connects by way of a cross-shaft 27 with a similar arm 26a at the opposite side of the vehicle. This cross-shaft 27 lies in a tubular housing 28 between the reaches of conveyor 7. These lever arms 26 and 26a connect respectively with longitudinally extended rods 29 and 29a which act on pivoted levers 30 and 30a. These levers act through links 31 and 31a which have a direct connection with the wheels 8 and 10. As shown clearly in Figs. VII and VIII, this connection is to one of a pair of steering balls 32, carried by the motor housing of each of the wheels 8, 9, 10 and 11. In the structural arrangement of Fig. V, in which (as will be discussed) the wheels are not individually equipped with motors, the links 31 and 31a engage with steering balls 33 on steering arms 34. In all figures of the drawings, levers 30 and 30a are also shown connected with longitudinal rods 35 and 35a connected with pivoted levers 36 and 36a. These levers in turn connect with operating links 37 and 37a. In all figures of the drawings, except Fig. V, all four wheels of the vehicle have a spindle mounting between the motor housings and embracing brackets 38. In the structure of Fig. V, the spindle mounting of the wheels is provided by spindles 39 placed between steering arm 34 and a similar arm, both carried by the wheel, and the housing through which the wheel is driven.

In Fig. IV of the drawings the steering control includes a hydraulic system, designated generally by reference numeral 41, and which acts through rod 42 on the arm 26a connected with cross-shaft 27. The steering connections are those above described for this figure of the drawings and for Figs. I and II, and differ from those shown in Fig. V only in the final attachment of the steering connections to the wheels. In Fig. IV the manual control element for steering the vehicle is shown as a steering lever 40, which is swung to the operator's right or left in accordance with the direction of travel desired. Obviously this lever of itself accommodates to reversed positions of the operator in facing toward the opposite ends of the vehicle. The brake and power controls in this figure of the drawings, as in Fig. V, are identical with those shown in Figs. I, II, III and VI, so that the entire operation of driving the vehicle is, for the operator, identical whichever end of the vehicle may lead.

Considering all the several described controls, the duplicate arrangement in mirror symmetry provides normal functions of the operator when facing in the forward direction of travel, whichever end of the vehicle may lead. This effect of identically driving the vehicle forward, whichever end of the vehicle may lead, is of substantial importance, since the vehicle must be accurately steered in restricted passages and around sharp corners. Since the travel with either end leading is effectively a forward travel, it is necessary to back the vehicle only in such minor movement as may be convenient in loading or unloading. The actual relative steering movement of the forward and rearward wheels also is identical with either end leading. This is primarily because all four wheels of the vehicle are steered. This eliminates the normal effect of "backing" a vehicle, since both the leading and the trailing wheels perform similarly, whichever pair of wheels may lead. Thus the difficulties of maneuvering vehicles having a pair of unsteered wheels in restricted space and around sharp corners are eliminated, by eliminating the longer effective radius on which a vehicle which includes unsteered wheels turns. As is well known, the greater space required at corners and intersections to allow for the turning radius imposed by unsteered wheels is a serious problem in coal mines, in many of which the width of the workings is strictly limited, because of the necessity to support the roof by closely spaced coal pillars or mine timbers. It will be noted in Figs. I, II and III of the drawings that the extension of the vehicle beyond the wheel axes does not differ greatly at the two ends of the vehicle. This extension of the vehicle structure is slightly greater at the discharging end, but the slight difference which exists is compensated by a tapered regional decrease in the transverse overall dimensions of the vehicle structure adjacent the discharge end of the vehicle. The same clearances therefore apply in turning corners whichever end of the vehicle may lead.

The simultaneous steering of all four wheels is useful in maneuvering the vehicle behind a loading device, particularly when the loading is performed near a sharp corner, because the vehicle must be properly positioned with respect to the discharge conveyor of the loader, and must be similarly relocated each time the position of the loading machine is changed while the vehicle is being loaded.

The functioning of the steering connections, by which the desirable steering effects are obtained, may now be described. In doing so attention is directed to Fig. III of the drawings, in which this functioning is illustrated, and to Figs. IV and V in which the steering connections are shown. As has been above noted, in two-wheel steering the steered and unsteered wheels on the same side of the vehicle roll on the arcs of radii of unequal length, whereas in four-wheel steering the radii on the arcs of which the leading and trailing wheels on the same side of the vehicle roll on the arcs of radii of equal length. In both types of steering, the wheels at the inner side of the vehicle during turning roll on the arcs of radii shorter than the radii on which the wheels at the outer side roll. Thus it is shown in Fig. III the wheels 8 and 9, on the side shown as the inner side of the vehicle in making the extreme turn which is illustrated, have equal angles $a^1$ and $a^2$ with the longitudinal axis of the vehicle, and roll on the arc of radius $r^1$. Similarly the wheels 10 and 11, on the side shown as the outer side of the vehicle in turning, have equal angles $a^3$ and $a^4$ with the longitudinal axis of the vehicle; and these wheels roll on the arc of radius $r^2$. Angles $a^1$ and $a^2$ are greater than angles $a^3$ and $a^4$. The difference between these angles varies with the degree of turning through which the vehicle is steered.

It is to be understood that a steering arrangement giving the effect illustrated in Fig. III is difficult to obtain in a vehicle which is slung so low with respect to its road-bed as is the shuttle car herein illustrated, or other mine haulage vehicles and vehicular mine machines. Now referring to Figs. IV and V of the drawings, it will be seen that the connections for both wheels on a side of the vehicle extend longitudinally of the vehicle, and may lie beneath the flare of the vehicle body, with but a single cross connection. Fig. III shows, as do also Figs. I and II, the arrangement of the steering linkages longitudinally of the vehicle body, and that the direct steering connections to the wheels are made in the wheel pockets of the vehicle body, where space is available for this purpose without detracting further from the carrying capacity of the body. As illustrated in Fig. V, the pivoted lever 30, the steering arm 34, and the interconnecting link 31 are accommodated in wheel pocket, or recess, 8a, and the corresponding connections to the other wheels 9, 10 and 11 are accommodated in the wheel pockets 9a, 10a and 11a.

The arrows applied to the showing of Figs. IV and V illustrate the action of the linkage elements in producing a steering movement in the direction shown in Fig. III, and which may be either a left hand turn in movement to the left on the sheet, or a right hand turn in moving to the right on the sheet. This action is identical in the showing of both Figs. IV and V; and referring specifically to Fig. V, movement of longitudinal rods 29 and 29a in the direction of the arrows act through pivoted levers 30 and 30a and the connections to the wheels 8 and 10 to give a reversed turning movement to those wheels. Rods 29 and 29a act through levers 30 and 30a, to move longitudinal rods 35 and 35a in the same longitudinal direction as rods 29 and 29a, and thus act through pivoted levers 36 and 36a to turn wheels 9 and 11 oppositely to wheels 8 and 10. It will be seen that the arrows in Fig. IV indicate a corresponding action.

In the showing of Fig. IV the housings of the motors 14 take the place of the steering arms 34 of Fig. V, the connections being otherwise the same. The single cross connection between the steering linkages on the different sides of the vehicle is the cross-shaft 27, which extends between the reaches of conveyor 7, and which interconnects arms 26 and 26a forming elements of the steering linkages on the two sides of the vehicle. To give compensation by which the wheels on the inner side in turning have an angle greater than those on the outer side, the arms 26 and 26a are inclined from the vertical, so that swinging movement of each of the arms, from the position in which it stands during straight-line progress of the vehicle, in one direction of rotation causes a greater movement of the steering rods associated with it than does equal swinging movement of the arm in the opposite direction. It will be noted that in both Fig. IV and Fig. V the inclination of arms 26 and 26a from a vertical position is shown as opposite, the steering instrumentalities as a whole being in the neutral, or straight-line position. In making the turn shown in Fig. III, the effect of the swinging movement of arm 26 on rod 29 is greater than the effect of the swinging movement of arm 26a on rod 29a. In making a turn opposite to the one shown in Fig. III, the effect is reversed.

It has been made clear that the attainment of four-wheel steering in this type of low-clearance vehicles, such as mine-haulage vehicles and wheel-mounted machines, gives peculiar advantages independently of the means used to propell the vehicle. Thus the four-wheel steering is effective whether the driving power of the vehicle is applied to all four of the vehicle wheels or to only two of them. There is, however, advantage both individual and conjointly with the four-wheel steering, in so arranging the power source and connections for the vehicle that driving connections across the vehicle are eliminated. This advantage exists even though but two of the wheels be driven, and there is particular merit in the arrangement in that it conforms with driving all four of the vehicle wheels, in spite of the absence of available space for mounting driving means or connections beneath the vehicle body.

As above noted, the power origin and transmission of Fig. V differs from that shown in all the other figures of the drawings in which the entire vehicle is shown. In Fig. V, two motors 43 and 43a are mounted at the receiving end of the vehicle. Imagining motors 43 and 43a to be applied in Figs. I and II, showing the general structure of the vehicle, these motors lie under the flare of the side walls in the receiving region of the vehicle. The motors drive through reduction gearing contained in housings 44 and 44a and connecting shafts 45 and 45a to a worm gear reduction in housings 46 and 46a, from which shafts in housings 47 and 47a have with wheels 9 and 11 a universal connection which permits simultaneous driving and steering of the wheels. From a connection with housings 44 and 44a connecting shafts 48 and 48a lead to a worm gear reduction within housings 49 and 49a. From the housings shafts lying in housings 50 and 50a also have a similar universal connection with wheels 8 and 10.

An example of a preferred individually-powered wheel is disclosed and claimed in the pending application of James H. Fletcher and myself, Serial No. 312,430, filed January 4, 1940, now Patent #2,258,328 issued Oct. 7, 1941, and entitled Vehicle wheel. Alternative driving means and connections of a preferred sort correspond to those disclosed and claimed in my companion application Serial No. 383,329, filed March 14, 1941, now Patent #2,317,623 issued Apr. 27, 1943, entitled Vehicle drive. Of these two forms of drive, whether all four wheels or only two wheels of the evhicle be driven, the individually-powered wheels may be used with advantage when the diameter of the wheels with their tires is adequate. The four-wheel steering of the vehicle gives its own advantageous effect whether or no the additional advantage of four-wheel driving is provided.

The driving arrangement of Fig. V does optionally give the advantages rising generally from four-wheel driving, and does so in a manner to avoid the use of driving connections across the vehicle structure. It will be readily understood that power transmission from separate motors along both sides of the vehicle permits the driving connections to lie within the flare of the vehicle side walls, and within the wheel pockets formed in those side walls.

The four-wheel drive, as obtained either by individually powered wheels or by the driving arrangement shown in Fig. V of the drawings, utilizes the entire weight of the vehicle in the development of tractive effort. The presence of loose material on the surface over which the vehicle moves, or steep grades within the mine, make maximum tractive effort desirable, and cause a vehicle embodying a four-wheel drive to present definite advantage. The distribution of tractive effort incidental to driving all four wheels of the vehicle equalizes the tractive effect of the vehicle wheels, and thus lessens the tendency of the wheels to slip, or to tear loose the material of the roadbed. By avoiding the necessity for using roughly treaded wheels, it further reduces disturbance of the roadbed. This is of substantial importance in coal mines, in which coal is present in or on the roadbed, and in which the creation and dispersion of coal dust is objectionable and dangerous.

By propelling the vehicle with all four wheels driven, and more particularly by simultaneously steering all four wheels of the vehicle, I provide a vehicle peculiarly adapted to meet the conditions existing in mines, and particularly the conditions existing in coal mines. In the adaptation of those features, the coal mine shuttle car herein shown and described may in the more general sense be considered as exemplary of all coal mine vehicles. In certain more definite structural particulars, the adaptation is specific to the type of coal mine vehicles purposed for the haulage of coal.

I claim as my invention:

1. A mine vehicle comprising a load-carrying body, steerable wheels mounted at both sides of the body with said body extending down between the wheels, steering link members extending along each side of said body and operatively connected to the wheels on that side, means near one side of the body at one end thereof beyond the wheels for actuating said members on one side of the body, and a cross connection extending across the body near one end of it beyond the wheels for operatively connecting said actuated members to said steering members on the opposite side of the body.

2. A mine vehicle comprising a load-carrying body, steerable wheels mounted at both sides of the body with said body extending down between the wheels and provided with side recesses receiving the wheels, steering link members extending along each side of said body and operatively connected to the wheels on that side, means near one side of the body at one end thereof beyond the wheels for actuating said members on one side of the body, a cross connection extending across the body between said means and the wheels at that end of the body, and means operatively connecting said cross connection to said steering members on both sides of the body whereby all of said members are actuated in unison.

3. A mine vehicle comprising a load-carrying body, steerable wheels mounted at both sides of the body with said body extending down between the wheels, steering members extending along each side of said body and operatively connected to the wheels on that side, means at one end of the body beyond the wheels for actuating said members on one side of the body, a rocker shaft extending across the body near one end of it beyond the wheels, and arms projecting laterally from said shaft for operatively connecting the shaft to said steering members on both sides of the body whereby the movements of said actuated members are transmitted to the steering members on the opposite side of the body.

4. A mine vehicle comprising a load-carrying body, steerable wheels mounted at both sides of the body with said body extending down between the wheels, steering members extending along each side of said body and operatively connected to the wheels on that side, means at one end of the body beyond the wheels for actuating said members on one side of the body, a rocker shaft extending across the body near one end of it beyond the wheels, and arms rigidly connected to the opposite ends of said shaft and pivotally connected to the adjoining ends of said steering members on both sides of the body, one of said arms being inclined forward and the other inclined backward when the wheels are headed straight ahead, whereby when the vehicle is rounding a curve the inner wheels travel in an arc having a shorter radius than the arc traveled by the outer wheels.

5. A mine vehicle comprising a load-carrying body, steerable wheels mounted at both sides of the body with said body extending down between the wheels, steering members extending along each side of said body and operatively connected to the wheels on that side, a rocker shaft extending across the body near one end of it beyond the wheels, an arm operatively connecting each end of said shaft to the adjoining end of the steering members on that side of the body, one of said arms being inclined forward and the other inclined backward when the wheels are headed straight ahead, and means operatively connected to one of said arms for actuating all of said steering members, whereby when the vehicle is rounding a curve the inner wheels travel in an arc having a shorter radius than the arc traveled by the outer wheels.

6. A mine vehicle comprising a load-carrying body, steerable wheels mounted at both sides of the body with said body extending down between the wheels, substantially vertical levers fulcrumed adjacent said wheels for oscillation in vertical planes extending lengthwise of the body, a link pivotally connecting the lower ends of the levers on each side of the body, a link pivotally connecting each lever to the adjacent wheel to steer it, a link pivotally connected to one of the levers on each side of the body and extending toward the adjacent end of the body, a cross connection extending across the body and operatively connected to the outer ends of said last-mentioned links, and means at said end of the body and at one side thereof for actuating said last-mentioned links whereby to steer said wheels.

7. A mine vehicle comprising a load-carrying body, an endless conveyor in the bottom of the body and having vertically spaced reaches extending longitudinally thereof, steerable wheels mounted at both sides of the body with the body extending down between the wheels, steering link members extending along each side of said body and operatively connected to the wheels on that side, a cross connection at one end of the body beyond the wheels and extending across the body between the reaches of said conveyor, means operatively connecting said cross connection to said steering members on both sides of the body, and means at one end of the body beyond the wheels and at one side of the conveyor for actuating said members to steer the wheels.

8. A mine vehicle comprising a load-carrying body, an endless conveyor in the bottom of the body and having vertically spaced reaches extending longitudinally thereof, steerable wheels mounted at both sides of the body with the body extending down between the wheels, steering members extending along each side of said body and operatively connected to the wheels on that side, a rocker shaft extending across the body between the reaches of the conveyor, arms rigidly connected to the ends of said shaft and projecting radially therefrom past the adjacent edges of the conveyor, means pivotally connecting said arms to the adjoining ends of said steering members on both sides of the body, and means at one end of the body beyond the wheels for actuating said members to steer the wheels.

ARTHUR L. LEE.